Figure 1:
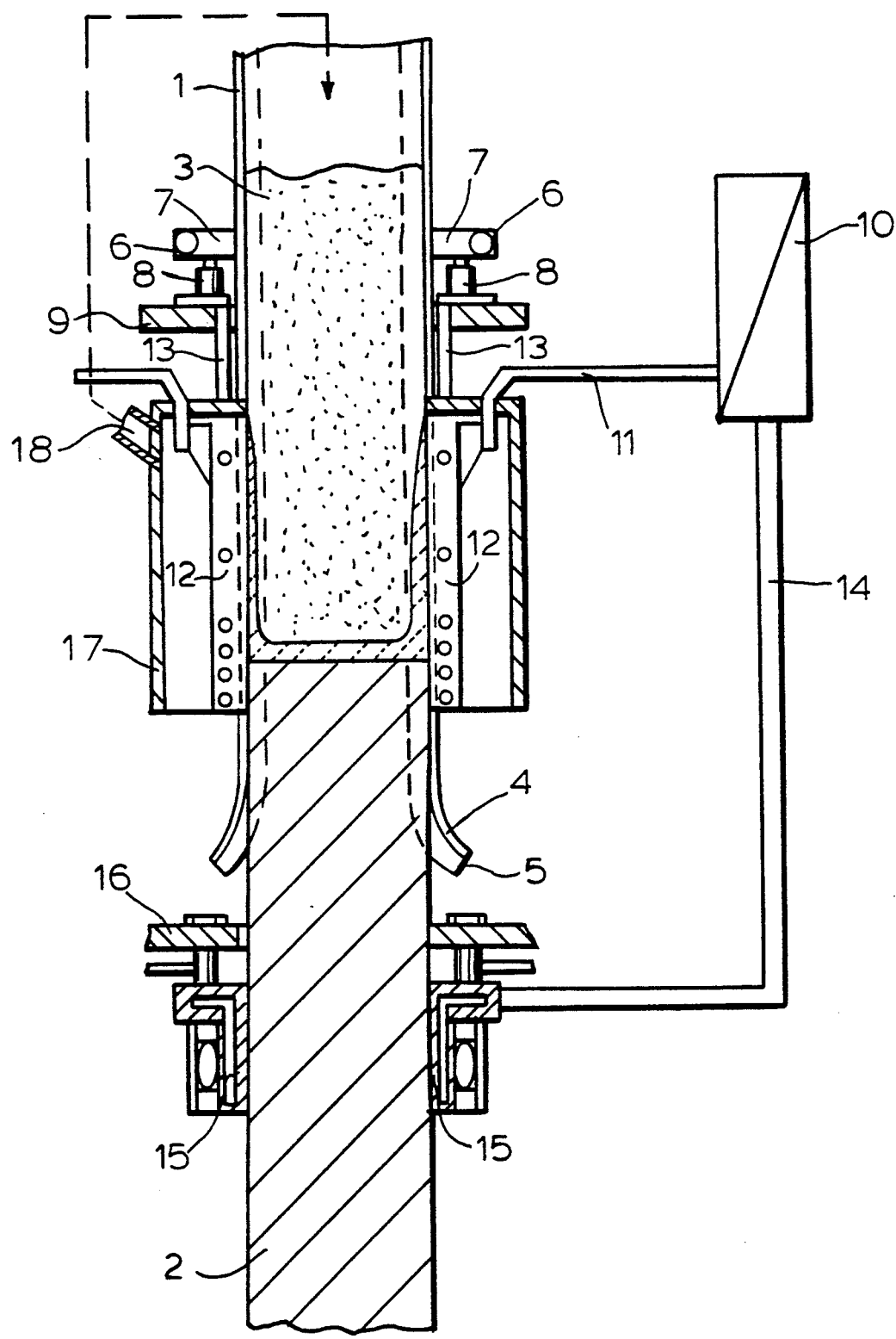

United States Patent [19]

Svana

[11] Patent Number: 5,146,469
[45] Date of Patent: Sep. 8, 1992

[54] METHOD AND MEANS FOR CONTINUOUS PRODUCTION OF CARBON BODIES

[75] Inventor: Erik Svana, Oslo, Norway

[73] Assignee: Elkem Technology a/s, Norway

[21] Appl. No.: 611,930

[22] Filed: Nov. 9, 1990

[30] Foreign Application Priority Data

Nov. 14, 1989 [NO] Norway .................................. 894526
Nov. 14, 1989 [NO] Norway .................................. 894527

[51] Int. Cl.$^5$ .............................................. H05B 7/09
[52] U.S. Cl. ........................................ 373/89; 373/94;
373/97; 373/98; 373/101; 373/120; 30/100;
432/242
[58] Field of Search .................... 373/89, 88, 97, 90,
373/101, 120, 94, 95, 98; 432/242; 30/100

[56] References Cited

U.S. PATENT DOCUMENTS

| | | | |
|---|---|---|---|
| 1,686,474 | 10/1928 | Soderberg | 373/89 |
| 1,774,674 | 9/1930 | Sem | 373/89 |
| 2,876,269 | 3/1959 | Tommelstad | 373/97 |
| 3,819,841 | 6/1974 | Persson | 373/89 |
| 4,424,584 | 1/1984 | Evensen | 373/97 |
| 4,481,637 | 11/1984 | Evensen | 373/97 |
| 4,527,329 | 7/1985 | Bruff et al. | 373/89 |
| 4,612,151 | 9/1986 | Bruff et al. | 373/89 |
| 4,663,844 | 5/1987 | Vegge | 30/100 |
| 4,678,434 | 7/1987 | Dahl et al. | 432/242 |
| 4,692,929 | 9/1987 | Cavigli et al. | 373/89 |
| 4,903,278 | 2/1990 | Koenig et al. | 373/97 |

FOREIGN PATENT DOCUMENTS

| | | |
|---|---|---|
| 147168 | 6/1983 | Norway . |
| 149451 | 4/1984 | Norway . |
| 149485 | 3/1985 | Norway . |
| 154860 | 1/1987 | Norway . |
| 156230 | 12/1987 | Norway . |
| 157078 | 1/1988 | Norway . |

Primary Examiner—Bruce A. Reynolds
Assistant Examiner—Tu Hoang
Attorney, Agent, or Firm—Lucas & Just

[57] ABSTRACT

The present invention relates to a method and a means for continuous production of elongated carbon bodies having a constant or substantially constant cross-section where a casing filled with unbaked paste consisting of carbon and a carbon containing binder is continuously baked to a solid carbon body by heating by means of direct electric current. The first terminal of the direct current source is being slidably connected to the casing through a plurality of vertical ribs extending radially outwards from the casing, said ribs being made from a current conducting material, and the second terminal of the direct current source being connected to the baked part of the carbon body or to a bottom contact in a smelting furnace in which the carbon body is consumed. The casing containing the carbon containing paste is continuously or substantially continuously moved in axial direction by means of slipping- and holding means. The present invention thus relates to carbon bodies baked outside a smelting furnace and to carbon bodies which are produced in direct connection with the smelting furnace wherein the carbon bodies are consumed.

13 Claims, 3 Drawing Sheets

METHOD AND MEANS FOR CONTINUOUS PRODUCTION OF CARBON BODIES

The present invention relates to a method and means for continuous production of elongated carbon bodies having a uniform cross-section, such as carbon electrodes for use in electric smelting furnaces, lining blocks and cathode- and anode blocks for electrolytic cells for production of aluminium. Carbon bodies having different cross-section such as for example circular, rectangular etc. can be produces according to the present invention. The method and means according to the present invention can also be used for baking of carbon electrodes in direct connection with the furnace in which the electrodes are consumed.

From Norwegian patent No. 149,451 it is known a method for continuous production of carbon electrodes in direct connection with a smelting furnace wherein the electrodes are consumed where an unbaked carbon containing paste consisting of carbon and a carbon containing binder is continuously baked to a solid carbon body by supplying unbaked carbon containing paste to an electrode casing having a cross-section corresponding to the cross-section of the carbon body which is to be produced, and continuously or substantially continuously lowering the casing containing the carbon containing paste down through a baking furnace arranged about the casing and supplying sufficient heat energy to the baking furnace in order to bake the carbon containing paste. As the casing is lowered through the baking furnace new sections of casing are added to the top of the casing and additional unbaked carbon-containing paste is supplied from the top of the casing. An important feature of the method according to Norwegian patent No. 149,451 is that the supply of energy for baking shall be independent of the energy supplied for the operation of the furnace itself.

According to Norwegian patent No. 149,451 any conventional energy source can be used for baking, such as electrical heating, induction heating, flame heating or convection heating. According to the Norwegian patent the energy for baking is supplied through a separate ringshaped chamber arranged about the electrode casing. It is, however, not explicitly explained how electrical energy shall be supplied.

In this known method the casing is removed from the baked carbon electrode before the electrode is consumed in the baking furnace. Thus the electrode can be used in smelting furnaces for production of products where iron contaminates the product, such as for example in furnaces for production of silicon. As the energy for baking in this known method is supplied to the outside of the casing, there will exist an upper limit of the diameter of the electrodes which can be produced, as the probability for crack formation in the baked electrode will increase with increasing electrode diameter. Further the baking speed will have to be reduced with increasing electrode diameter in order to effect baking of the center of the electrode. Thus it is believed that there exists an upper limit of the electrode diameter of about 1400 mm for electrodes which can be produced according to the method of Norwegian patent No. 149,451.

From Norwegian patent Nos. 154,860 and 157,078 which relate to further developments of the invention according to Norwegian patent No. 149,451, it is known to use a gas as a source for heating and baking of the carbon containing paste. Use of gas for heating and baking of the carbon containing paste does, however, cause some disadvantages such as need for extra space for the baking furnace and the need for means for complete collection of the rather high volumes of off-gases.

Use of gas as a source for heating further gives a restriction in the diameter or cross-section of the carbon bodies which are to be produced, as the heating is dependent on heat conduction from the periphery and inwards to the center of the carbon body. This restricts the baking speed and further gives a tendency of formation of cracks in the center of carbon bodies having a big diameter.

From Norwegian patent No. 147,168 it is known a holding and current supply arrangement for electrodes for a selfbaking electrode in an electric smelting furnace where the electrode casing is equipped with vertical ribs projecting radially outwards from the casing. The holder arrangement comprises a plurality of clamping means slidably arranged on the ribs. The clamping means function both as means for conducting current into the electrode and means for holding the electrode in position. Each clamping means according to Norwegian patent No. 147,168 comprises two substantially identical reversed parts being operative to contact the ribs for conducting current into the electrode and being adapted for slidably clamping against the ribs whereby the clamping means impose only tangential forces on the casing of the electrode.

In Norwegian patent No. 149,485 it is disclosed an electrode feeding assembly and a method for feeding electrodes in electrothermic smelting furnaces. The electrode feeding assembly comprises a plurality of electrode feeding units, arranged around the periphery of the electrode, each including a clamping means exerting a releasable pressure on a rib. The method and the assembly disclosed in Norwegian patent No. 149,485 are intended for use in connection with the holding arrangement disclosed in Norwegian patent No. 147,168.

The methods and means which are disclosed in Norwegian patent Nos. 147,168 and 149,485 have so far only been used in connection with so-called Soderberg electrodes where the casing is following the electrode down into the smelting furnace. In these kind of electrodes the casing is equipped with vertical inner radial ribs having a big radial extension in order to reinforce the baked carbon electrode. For this kind of electrode crack formations in the baked electrode are of less importance as the electrode is kept together by the casing and inner ribs.

It is an object of the present invention to provide a method and means for continuous production of elongated carbon bodies where the above-mentioned disadvantages of the known art are avoided and whereby it is possible to produce carbon bodies having a diameter of 2 meters or more.

Accordingly the present invention relates to a method for continuous production of elongated carbon bodies having a constant or substantially constant cross-section where a casing filled with unbaked paste consisting of carbon and a carbon containing binder is continuously baked to a solid carbon body by heating by means of electric current, the method being characterized in that the baking is carried out by means of direct electrical current, the first terminal of the direct current source being slidably connected to the casing through a plurality of vertical ribs extending radially outwards from the casing, said ribs being made from a current conducting material, and the second terminal of the direct current source being connected to the baked part of the carbon body or to a bottom contact in a smelting furnace in which the carbon body is consumed, and that the casing containing the carbon-containing paste is continuously or substantially continuously moved in axial direction by means of slipping- and holding means.

According to a preferred embodiment of the method according to the present invention it is used a casing having vertical ribs extending radially inwardly in the casing in order to ensure a good electrical contact between the outer ribs of the casing and the unbaked carbon-containing paste. The radial extension of the inner ribs is between 1 and 10 cm and preferably between 2 and 6 cm.

According to another preferred embodiment of the method according to the present invention, a perforated casing is used and gases which evolve during the baking of the carbon body are combusted by supply of air to the area of the supply of direct current. This combustion gives an extra supply of heat energy to the baking of the carbon containing paste and gives a faster formation of an outer shell of baked paste. This shell of baked paste has a good electrical conductivity and gives an improved distribution of the supplied direct current.

The combination of heat energy from combustion of the volatile components in the carbon containing paste in a preheating zone and supply of heat energy by supply of direct current results in an optimal shape and level of the baking zone and a high baking speed in addition to a reduced tendency of crack formation in the baked carbon body. By the method according to the present invention it is thus obtained very favorable baking conditions making it possible to produce a high quality electrode at the same time as the baking speed can be kept at such a high level that the baking of electrode of any time is equal to or higher than the consumption of the electrode in the smelting furnace.

The present invention further relates to means for production of elongated carbon bodies having a constant or a substantially constant cross-section, where a casing containing unbaked, carbon containing paste, is continuously baked to a solid carbon body by means of electric current, the means comprising a direct electrical current source, which first terminal via current supply means is slidably connected to a plurality of vertical ribs extending radially outwards from the casing, the ribs being made from a current conducting material, and the second terminal being connected to the baked part of the carbon body or to a bottom contact in a smelting furnace in which the carbon body is consumed, holding- and slipping means connected to the radial ribs of the casing and arranged above the current supply means, which holding- and slipping means is arranged for a substantially continuous downward movement of the casing.

Use of direct electrical current as a source for heating the carbon containing paste gives an efficient baking as the direct current is distributed throughout the cross-section of the carbon-containing paste whereby an equal heating and baking of the carbon containing paste is obtained. This makes it possible to produce continuous baked carbon bodies with a very big diameter. Thus it is possible to produce carbon bodies having a diameter of 2 meters and more.

By the method and the means according to the present invention it is obtained a baking process making it possible to produce carbon bodies having an optimal quality combined with a maximum productivity. The productivity is dependent on a high baking speed which again is dependent on the time needed to remove the gases which evolve from the carbon containing paste during the baking process. By the present invention it is obtained a baking process where these gases are removed through the outer shell baked carbon, whereafter the heat for further baking towards the center of the carbon body is supplied by direct electrical current.

By using current supply means having a rather long vertical extension, the direct electrical current is supplied to a rather large area of the casing. The combustion of the evolved gases will thereby contribute to soften the carbon paste and to bake a shell of baked carbon above the place where electrically generated heat is supplied to the carbon body.

A part of the hot off-gases from combustion of the evolved gases is preferably supplied into the casing from above in order to increase the softening rate of the carbon containing paste.

By the combination of heat supplied from above and inside the casing for preheating and softening of the carbon containing paste, and baking by heat generated by combustion of the gases evolved, the heat generated by the supplied direct current will give a very efficient and fast baking due to the efficient penetration of heat energy into the carbon body which is obtained by the use of direct current. By a correct use of the above-mentioned sources of heat energy, the level and the shape of the baking zone can be influenced in order to obtain a baking zone which according to experience will give a carbon body having a maximum strength and a minimum of crack formation.

The slidable connection of the first terminal of the direct electrical current source can preferably be done by using current connection means as disclosed in Norwegian patent No. 147,168. In this patent it is described current connection means for supplying electric current to so-called Soderberg electrodes, the current connection means comprising contact means made from two separate, elongated contact bodies which are pressed against opposite sides of outer vertical ribs on the casing, the two separate contact bodies being connected to each other by means of a device exerting an adjustable pressure against the rib.

The holding and slipping means which are used in connection with the present invention is preferably of the kind described in Norwegian patent No. 149,485. This holding and slipping means comprises a plurality of clamping members intended to clamp against the vertical outer ribs on the casing, each clamping member having means for temporarily releasing of the clamping force on the ribs.

When the carbon bodies are not produced in direct connection with a smelting furnace wherein the carbon bodies are consumed the connection of the second terminal of the direct current source to the baked carbon body can be done in a number of different ways. According to a first embodiment, the second terminal of the direct current source is connected to the baked carbon body by means of contact elements suspended from the building and arranged about the circumference of the baked carbon body. The contact elements are forced into electrical contact with the surface of the carbon body by means of a conventional pressure ring. In this embodiment the casing of the carbon body has to be removed above the contact elements. By the downward movement of the baked carbon body during baking, the baked carbon body will be pressed down through the contact elements. Preset lengths of baked carbon body are then cut away below the contact elements.

According to a second embodiment the second terminal of the direct current source is connected to the baked carbon body by means of contact bars inserted into the lower end of the carbon body.

According to a third embodiment the second terminal of the direct current source is connected to the baked carbon body by means of a contact device inserted into a central bore in the baked carbon body. The central bore can be made in conventional way, for example by arranging wooden bars in the center of the unbaked carbon-containing paste. The wooden bars will be burned away during the baking of the carbon containing paste and leave a central bore in the baked carbon body.

According to a fourth embodiment the second terminal of the direct current source is connected to the baked carbon body by means of an outer locked contact device which follows the carbon body downwards during progress of the baking process. After a preset length of carbon body has been baked and the casing has been removed, the contact device is unlocked and moved to a higher position, whereafter the baked carbon body below the contact device is cut away.

When the carbon body is produced in direct connection with a smelting furnace wherein the carbon body is consumed, the supplied direct electric current also functions as a supply of energy to the smelting furnace itself. In this embodiment the second terminal of the direct current source is connected to a bottom contact in the smelting furnace.

Figure 2:
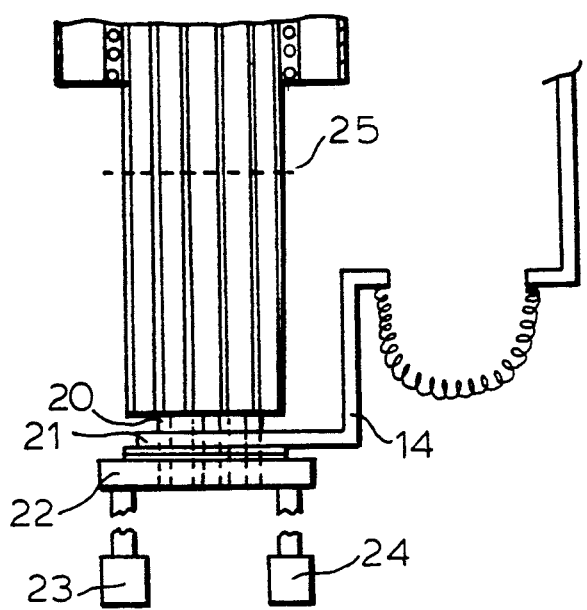
Figure 4:
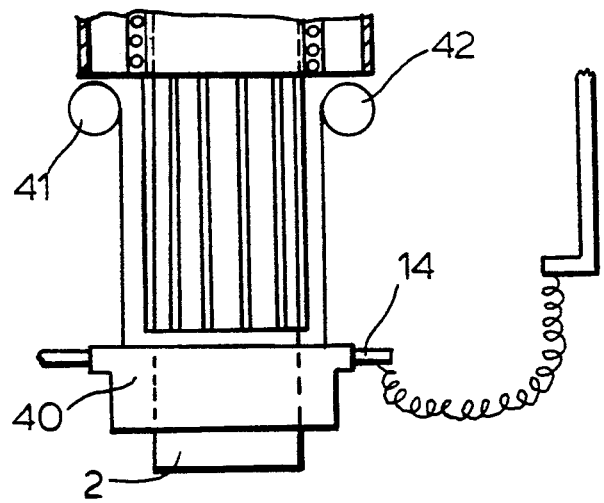
Figure 3:
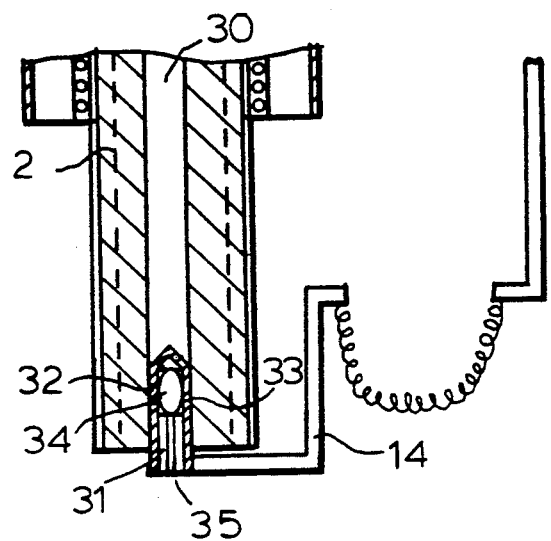
Figure 5:
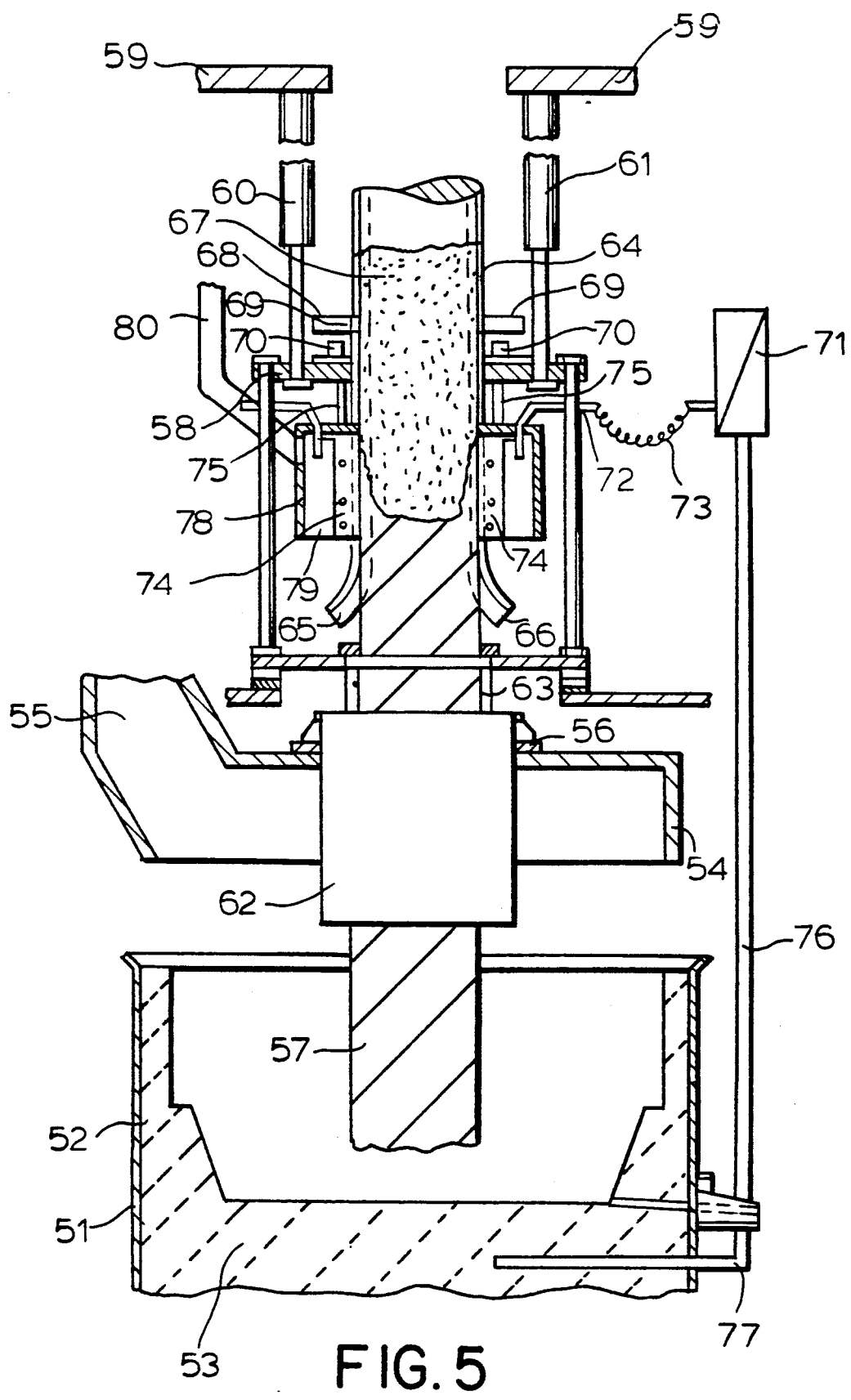

The present invention will now be further described with reference to the drawings, wherein;

FIG. 1 shows a vertical cut through a first embodiment of the present invention for production of carbon bodies outside a smelting furnace, FIG. 2 shows a second embodiment for connection of the second terminal of the direct current source, FIG. 3 shows a third embodiment for connection of the second terminal of the direct current source, and FIG. 4 shows a fourth embodiment for connection of the second terminal of the direct current source, and wherein FIG. 5 shows a vertical cut through a second embodiment of the present invention for baking carbon bodies which is in direct connection with a smelting furnace wherein the carbon bodies are consumed.

On FIG. 1 there is shown a casing 1 having a cross-section corresponding to the outer cross-section of the carbon body 2 to be produced. In the upper part of the casing 1 there is kept unbaked carbon-containing paste 3 comprising a particulate carbonaceous material and a carbon-containing binder. The casing 1 is equipped with a plurality of vertical ribs 4 extending radially outwards from the casing. The casing is further equipped with a plurality of inner vertical ribs 5 extending radially inwards in the casing. During the proceeding of the baking process additional carbon containing paste is added to the casing 1 from the top.

The casing 1 is suspended by means of a holding-and slipping device 6 preferably of the same kind as described in Norwegian patent No. 149,485 intended for use in production of Soderberg electrodes. This holding- and slipping device 6 comprises a plurality of gripping members 7 which clamp against the outer radial ribs 4 by means of an adjustable and temporarily releasable force. The holding- and slipping device 6 further comprises an hydraulic cylinder 8 for each gripping member 7 intended for vertical movement of the gripping member 7.

The cylinders 8 are suspended from the building construction 9. By means of the holding- and slipping device 6 the casing can be moved downwards in vertical direction in small steps and at a preset speed.

From a direct electrical current source 10 the first terminal 11 is connected to a number of current supply devices 12. The current supply devices 12 are preferably of the same kind as described in Norwegian patent No. 147,168. Each of the current supply devices 12 comprises two elongated contact members clamping against opposite sides of an outer rib 5 and being connected to each other by means which exerts and adjustable clamping force on the rib 4. The clamping force is adjusted in order to obtain a good electrical contact at the same time as the casing 1 can be pressed down through the current supply devices 12 by means of the holding- and slipping device 6. In order to keep the current supply devices 12 at rest, the current supply devices 12 are suspended from the building construction 9 by means of rods 13.

By use of the above described current supply devices 12 the direct current will be supplied to the carbon containing paste over a rather long vertical distance. The number of current supply devices 12 are preferably equal to the number of outer ribs 4.

The second terminal 14 of the direct current source 10 is connected to contact elements 15 arranged about the baked part of the carbon body 2. The contact elements 15 are of conventional design and are affixed to the building construction 16 by rods 13. The casing 1 is removed from the baked part of the carbon body in the area between the current supply devices 12 and the building construction 16.

When a preset length of baked carbon body 2 has passed below the contact elements 15, this length is cut away. In this way the carbon body is produced in preset lengths.

In order to collect gases which evolve during baking of the carbon containing paste, it is arranged a gas collection device 17 equipped with an off-gas suction device 18. The gas collection device 17 is open at its lower end and air will be sucked in through this opening and the gases evolved during baking will be combusted and thereby add extra heat energy to the baking process.

In FIG. 2 there is shown a second embodiment for connection of the second terminal 14 of the direct current source 10. In the embodiment shown in FIG. 2 contact rods 20 are inserted into the lower end of the baked carbon body and the second terminal 14 of the direct current source 10 is connected to the contact rods 20 by means of a connection device 21. When the baked carbon body is moved downwards, the connection device 21 will follow the downward movement of the contact rods 20. In order to prevent uncontrolled movement of the baked carbon body, the contact rods 20 are connected to a clamping device 22. The clamping device 22 is arranged upon hydraulic cylinders 23, 24. The maximum length of movement of the piston rods of the cylinders 23, 24 is adjusted according to the preset length of the carbon body. Thus when cylinders 23, 24 are in their lower position the carbon body is cut below the current supply device 12 as indicated at 25. The contact rods 20 are thereafter removed from the finished carbon body and are thereafter again inserted into the lower end of the above baked carbon body whereafter the casing with the carbon body again is moved downwards.

In the embodiment shown on FIG. 3 the carbon body is produced with a central cylindrical bore 30. This can for example be done by inserting wooden rods into the unbaked carbon containing paste. In this case the second terminal 14 of the direct current source 10 is connected to the baked carbon body by means of a contact member 31 which is inserted into the central bore of the baked carbon body from below. The contact member 31 preferably comprises contact pieces 32, 33 made from metal which are forced against the sidewalls of the bore 30 by means of a pressurizable hose 34. The hose 34 is via a pipe 35 connected to a pressurized gas source, for example pressurized air. When a preset length of carbon body has been baked the current supply is shut off and a length of the carbon body is cut away, whereafter the contact member 31 is inserted into the bore 30 of the carbon body.

By using the embodiment according to FIGS. 2 and 3, the casing need not be removed from the baked carbon body before the carbon body is cut into preset lengths.

In the embodiment shown on FIG. 4, a contact member 40 is connected to the periphery of the carbon body and connected to the second terminal 14 of the direct current source 10. The contact member 40 follows the downward movement of the carbon body during the baking process. The contact member 40 is suspended in a hoist arrangement 41, 42 which will also prevent uncontrolled downward movement of the carbon body 2. When the carbon body 2 has reached its lowest possible position, the casing is removed. The contact member 40 is then moved upwards by the hoist arrangement 41, 42 and a length of the carbon body is cut away.

On FIG. 5 there is shown a smelting furnace 51 having a refractory lining 52 and a bottom lining 53. The smelting furnace 51 is further equipped with a smoke-hood 54 with an off-gas channel 55 and with a central opening 56 for a carbon body or an electrode 57 for supplying energy to the smelting furnace 51. The electrode 57 is in conventional way suspended in an electrode frame 58 which is suspended in the building construction 59 via electrode suspension- and regulating cylinders 60, 61.

In the area where the electrode 57 extends through the opening 56 in the smoke hood 54 it is arranged a combined electrode holding- and sealing member 62. The combined electrode holding- and sealing member 62 is suspended from the electrode frame 58 by means of a cylindrical ring 63. The combined electrode holding- and sealing member 62 is of conventional design and can for example comprise pressure plates which are pressed against the circumference of the electrode by means of a pressure ring. The pressure ring is preferably equipped with inner channels for circulation of a cooking medium.

The means for continuous production of the carbon electrode 57 will now be described.

A perforated electrode casing 64 having vertical ribs 65 projecting radially outwards from the casing and having inner vertical ribs 66 projecting radially inwards in the casing is filled from the top with unbaked carbon containing paste 67. The casing 64 is suspended in a holding- and slipping device 68 of the type described above in connection with the embodiment shown on FIG. 1 and comprises a plurality of electrode feeding units 69, each including a clamping means exerting a releasable pressure on a rib 65. The holding- and slipping device 68 further comprises a hydraulic cylinder 70 for each electrode feeding unit 69 for vertical movement of the clamping means. The cylinder 70 is arranged upon the electrode frame 58.

From a direct electric current source 71 the first terminal 72 is via flexibles 73 connected to current supply devices 74. The current supply devices 74 are of the kind as described above in connection with FIG. 1. The current supply devices 74 comprise two substantially identical reversed parts being operative to contact the outer ribs 65 for conducting current into the electrode paste and being adapted for slidably clamping against the outer ribs 65. The pressure on the clamping means is adjusted in order to obtain a good electrical connection at the same time as the casing 64 by means of the holding- and feeding device 68 can be pressed down through the current supply devices 74 and the combined electrode holding- and sealing member 62. In order to prevent vertical movement of the current supply devices 74, they are suspended in the electrode frame 58 by means of rods 75. The second terminal 76 of the direct current source 71 is connected to a bottom electrode 77 arranged in the bottom lining 53 of the smelting furnace 51.

In the area about the current supply devices 74 it is arranged a gas collection device 78 for collection and combustion of gases which evolve during baking of the electrode paste. The gas collection device 78 is sealed against the electrode casing in its upper end and is open in its lower end. Hence air will be sucked in through an annulus 79 between the electrode casing and the gas collection device 78. The gas collection device 78 is further equipped with a gas outlet 80 for collection of the combustion gases.

The direct electric current which is supplied via the current supply devices 74 is used both for baking of the electrode paste and for supplying electric energy to the smelting furnace 51. The direct current will in the area of current supply devices 74 be supplied to the electrode paste over a rather long vertical distance and the paste will thereby be heated and baked equally throughout the cross-section of the electrode.

The electrode casing 64 is removed from the baked electrode in the area below the current supply devices 74, but above the combined electrode holding-and sealing member 62. The electrode casing 64 is removed by means of conventional apparatuses for example such as disclosed in Norwegian patent No. 156,230.

In order to remove the casing with the inner ribs 66, the radial extension of the inner ribs 66 is less than 10 cm and preferably less than 6 cm.

What is claimed is:

1. A method for making an elongated carbon body of baked carbon from unbaked carbon paste using a casing wherein the casing is removed after formation of the elongated carbon body of baked carbon comprising the steps of:

(a) filling a removable casing with unbaked carbon paste, said casing being vertically oriented and having a plurality of permanent, vertically oriented ribs extending radially outward from said casing, said ribs being made from a current conducting material;

(b) providing a first terminal slidably connected to at least one of said plurality of ribs for conducting electricity to said casing;
(c) providing a second terminal positioned below said first terminal, said second terminal being in electrical contact with a baked part of the elongated carbon body;
(d) providing a means for slipping and holding said casing so as to allow said casing to move vertically downward, said means for slipping and holding said casing being positioned above said first terminal; and
(e) supplying direct current through the first and second terminals to said carbon paste to bake said carbon paste and form said elongated carbon body wherein said casing is removed after baking but prior to use of the elongated carbon body of baked carbon.

2. The method of claim 1 wherein the casing is perforated and a gas collection device is arranged to cover the first terminal and surround said casing such that gases which evolve during baking of the carbon paste are combusted by air in the gas collection device.

3. A method for making an elongated carbon body of baked carbon from unbaked carbon paste comprising the steps of:
(a) filling a casing with unbaked carbon paste, said casing being vertically oriented and having a plurality of permanent, vertically oriented ribs extending radially outward from said casing, said ribs being made from a current conducting material, said casing further comprises radial vertical inner ribs extending inwardly into the paste, said inner ribs having a radial extension between 1 and 10 cm;
(b) providing a first terminal slidably connected to at least one of said plurality of ribs for conducting electricity to said casing;
(c) providing a second terminal positioned below said first terminal, said second terminal being in electrical contact with a baked part of the elongated carbon body;
(d) providing a means for slipping and holding said casing so as to allow said casing to move vertically downward, said means for slipping and holding said casing being positioned above said first terminal; and
(e) supplying direct current through the first and second terminals to said carbon paste to bake said carbon paste and form said elongated carbon body.

4. The method of claim 2 wherein part of the gases which evolve during baking is supplied to the carbon paste in the casing to preheat the paste.

5. A system for producing an elongated carbon body of baked carbon from unbaked carbon paste using a casing which is removed after formation of the elongated carbon body of baked carbon comprising:
(a) a vertically oriented removable casing containing unbaked carbon paste, said casing having a plurality of permanent, vertically oriented ribs extending radially outward from said casing, said ribs being made from a current conducting material;
(b) a first terminal slidably connected to at least one of said plurality of ribs for conducting electricity to said casing;
(c) a second terminal positioned below said first terminal, said second terminal being in electrical contact with a baked part of the elongated carbon body;
(d) a means for slipping and holding said casing so as to allow said casing to move vertically downward, said means for slipping and holding said casing being positioned above said first terminal; and
(e) direct current means connected to both said first and second terminals and providing direct current through the first and second terminals to said carbon paste to bake said carbon paste and form said elongated carbon body wherein said casing is removed after baking but prior to use of the elongated carbon body of baked carbon.

6. The system of claim 5 further comprising a gas collection device arranged to cover the first terminal and surround said casing, said gas collection device having supply means for combustion air therein and an off-gas suction device connected to said gas collection device.

7. A system for producing an elongated carbon body of baked carbon from unbaked carbon paste comprising:
(a) a vertically oriented casing containing unbaked carbon paste, said casing having a plurality of permanent, vertically oriented ribs extending radially outward from said casing, said ribs being made from a current conducting material, said casing further comprises inner, radially extending vertical ribs having a radial extension of less than 10 cm;
(b) a first terminal slidably connected to at least one of said plurality of ribs for conducting electricity to said casing;
(c) a second terminal positioned below said first terminal, said second terminal being in electrical contact with a baked part of the elongated carbon body;
(d) a means for slipping and holding said casing so as to allow said casing to move vertically downward, said means for slipping and holding said casing being positioned above said first terminal; and
(e) direct current means connected to both said first and second terminals and providing direct current through the first and second terminals to said carbon paste to bake said carbon paste and form said elongated carbon body.

8. The system of claim 7 wherein the inner ribs have a radial extension of between 1 and 10 cm.

9. The system of claim 5 wherein the second terminal is connected to the baked part of the elongated carbon body by means of a plurality of contact elements arranged about the elongated carbon body.

10. The system of claim 5 wherein the second terminal is connected to the baked part of the elongated carbon body through contact rods inserted into a lower end of the baked carbon body.

11. A system for producing an elongated carbon body of baked carbon from unbaked carbon paste using a casing which is removed after formation of the elongated carbon body of baked carbon comprising:
(a) a vertically oriented removable casing containing unbaked carbon paste, said casing having a plurality of permanent, vertically oriented ribs extending radially outward from said casing, said ribs being made from a current conducting material;
(b) a first terminal slidably connected to at least one of said plurality of ribs for conducting electricity to said casing;
(c) a second terminal positioned below said first terminal, said second terminal being in electrical contact with a baked part of the elongated carbon body, said second terminal being connected to the baked part of the elongated carbon body by means of a contact member inserted into a central bore in the baked part of the elongated carbon body;

(d) a means for slipping and holding said casing to allow said casing to move vertically downward, said means for slipping and holding said casing being positioned above said first terminal; and (e) direct current means connected to both said first and second terminals and providing direct current through the first and second terminals to said carbon paste to bake said carbon paste and form said elongated carbon body.

12. The system of claim 5 wherein the second terminal is connected to the baked part of the elongated carbon body by means of contact members connected to hoist arrangements.

13. The system of claim 7 wherein the inner ribs have a radial extension of between 2 and 6 cm.

* * * * *